US010484751B2

(12) United States Patent
Dewa et al.

(10) Patent No.: US 10,484,751 B2
(45) Date of Patent: Nov. 19, 2019

(54) TRANSMISSION APPARATUS, AIT TRANSMISSION METHOD AND RECEPTION APPARATUS

(71) Applicant: SONY CORPORATION, Tokyo (JP)

(72) Inventors: Yoshiharu Dewa, Tokyo (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 15/257,707

(22) Filed: Sep. 6, 2016

(65) Prior Publication Data
US 2016/0373832 A1 Dec. 22, 2016

Related U.S. Application Data

(63) Continuation of application No. 14/309,556, filed on Jun. 19, 2014, now Pat. No. 9,451,333, which is a
(Continued)

(51) Int. Cl.
H04N 21/647 (2011.01)
H04N 21/462 (2011.01)
H04N 21/434 (2011.01)
H04N 21/8545 (2011.01)
H04N 21/81 (2011.01)
(Continued)

(52) U.S. Cl.
CPC ...... H04N 21/64784 (2013.01); H04H 20/93 (2013.01); H04H 20/95 (2013.01); H04N 21/4345 (2013.01); H04N 21/462 (2013.01); H04N 21/8166 (2013.01);
(Continued)

(58) Field of Classification Search
CPC ........ H04H 20/93; H04H 20/95; H04H 60/82; H04N 21/4345; H04N 21/462; H04N 21/64784; H04N 21/8166; H04N 21/8545
See application file for complete search history.

(56) References Cited

U.S. PATENT DOCUMENTS 6,262,985 B1 * 7/2001 Huang ................... H04L 45/742
370/397
2004/0028123 A1 * 2/2004 Sugar .................... H04L 1/1664
375/224
(Continued)

OTHER PUBLICATIONS

European Search Report received for European Patent Application No. 15191370.4, dated Feb. 25, 2016, pp. 7.
(Continued)

Primary Examiner — Robert J Hance
Assistant Examiner — Jen-Shi Huang
(74) Attorney, Agent, or Firm — Chip Law Group

(57) ABSTRACT

Disclosed herein is a transmission apparatus, including: an application data transmission section adapted to transmit data of an application for HbbTV; and an AIT transmission section adapted to transmit an AIT including an application profile which represents one or more additional functions to the application and is configured from a first bit region of high-order n bits and a second bit region of lower-order (16−n) bits which represent presence or absence of functions allocated to bit positions thereof with a bitmap structure and wherein, in the first bit region, values for changing over the functions to be allocated to the bit positions in the second bit region are set.

10 Claims, 5 Drawing Sheets

Related U.S. Application Data continuation of application No. 13/591,448, filed on Aug. 22, 2012, now Pat. No. 8,793,754.

(60) Provisional application No. 61/528,466, filed on Aug. 29, 2011.

(51) Int. Cl.
*H04H 20/95* (2008.01)
*H04H 20/93* (2008.01)
*H04H 60/82* (2008.01)

(52) U.S. Cl.
CPC ..... *H04N 21/8186* (2013.01); *H04N 21/8545* (2013.01); *H04H 60/82* (2013.01)

(56) References Cited

U.S. PATENT DOCUMENTS

| | | | | |
|---|---|---|---|---|
| 2007/0079179 | A1* | 4/2007 | Jourdan | G06F 9/3001 714/49 |
| 2007/0112786 | A1 | 5/2007 | Shin et al. | |
| 2009/0307543 | A1* | 12/2009 | Andreev | G11C 29/1201 714/718 |
| 2011/0032327 | A1* | 2/2011 | Ikeda | G11B 27/105 348/42 |
| 2011/0093895 | A1 | 4/2011 | Lee et al. | |
| 2011/0164121 | A1* | 7/2011 | Ikeda | G11B 27/105 348/51 |
| 2012/0284749 | A1 | 11/2012 | Lee et al. | |
| 2013/0019265 | A1 | 1/2013 | Waller | |

OTHER PUBLICATIONS

European Search Report received for European Patent Application No. 15191448.8, dated Jan. 29, 2016, pp. 7.
European Search Report received for European Patent Application No. 15191061.9, dated Feb. 3, 2016, pp. 5.
Extended European Search Report dated Feb. 26, 2015 in patent application No. 12827185.5.
DVB Organization, "Digital Video Broad Casting (DVB): Signalling and carriage of interactive applications and services in hybrid broadcast/broadband environments" Draft ETSI ES 2XX Xxx v<m.t.e.> (Feb. 2009), tm-mis-0053r11-hybrid-application-signalling-draft.doc, Geneva, CH, Sep. 21, 2009, pp. 1-98.
Office Action dated Dec. 2, 2014 in Japanese Patent Application No. 2014-222889 (with English language translation).
Office Action dated Dec. 2, 2014 in Japanese Patent Application No. 2014-222890 (with English language translation).
Office Action dated Dec. 2, 2014 in Japanese Patent Application No. 2014-222891 (with English language translation).
Specification of Japanese Patent Application No. 2014-222890 Filed Oct. 31, 2014.
Specification of Japanese Patent Application No. 2014-222891 Filed Oct. 31, 2014.
Specification of Japanese Patent Application No. 2014-222889 Filed Oct. 31, 2014.
"Hybrid Broadcast Broadband TV", ETSI TS 102 796, V1 .1.1 (Jun. 2010), Technical Specification, © European Telecommunications Standards Institute 2010, © European Broadcasting Union 2010, 75 Pages.
International Preliminary Report on Patentability dated Dec. 6, 2013, in PCT/JP2012/005215, filed Aug. 21, 2012.
"Application Execution Engine Platform for Digital Broadcasting", ARIB Standard, ARIE: Version 1. 2, Association of Radio Industries and Businesses, Jul. 29, 2009, 1 front page, pp. 39-73.
International Search Report dated Nov. 20, 2012 in PCT/JP2012/005215.
"Digital Video Broadcasting (DVB); Signalling and carriage of interactive applications and services in Hybrid broadcast/broadband environments", ETSI TS 102 809, V1 .1. 1, Jan. 2010, pp. 14-35 and cover page.
Card, Remy & Ts'o, Theodore. & Tweedie, Stephen (1994). "Design and Implementation of the Second Extend Filesystem". Proceedings of the First Dutch International Symposium on Linux. ISBN 90-367-0385-9.
Office Action for CN Patent Application No. 201280040694.0, dated Nov. 8, 2016, 04 pages of Office Action and 07 pages of English Translation.
Office Action for KR Patent Application No. 10-2014-7004130, dated Oct. 5, 2018, 6 pages of Office Action and 5 pages of English Translation.
"Digital Video Broadcasting (DVB); Signalling and Carriage of Interactive Applications and Services in Hybrid Broadcast/ Broadband Environments", ETSI TS 102 809 V1.1.1, Jan. 2010, 98 pages.

\* cited by examiner

TRANSMISSION APPARATUS, AIT TRANSMISSION METHOD AND RECEPTION APPARATUS

CROSS-REFERENCE TO RELATED APPLICATION

This application is a continuation of U.S. application Ser. No. 14/309,556 filed Jun. 19, 2014, which claims the priority from U.S. application Ser. No. 13/591,448 filed Aug. 22, 2012, which claims the priority to Provisional Application Ser. No. 61/528,466, filed on Aug. 29, 2011. The entire contents of each of the forgoing applications is incorporated herein by reference.

BACKGROUND

The present technology relates to a transmission apparatus, an AIT transmission method and a reception apparatus adopted by the HbbTV system.

The HbbTV (Hybrid broadcast broadband TV) originates from integration of specifications of the Interactive TV drafted in Germany and France. The HbbTV is based on Web technologies or existing standards, and as a result, re-utilization of a server environment or an application development environment is facilitated. In order to implement more abundant viewing experience of the TV, the HbbTV structures a composite environment of broadcasting of a TV receiver and a broadband (IP (Internet Protocol) network). The HbbTV does not depend on a transmission layer such as a ground wave, a satellite, a cable or the like. Thus, in Germany, the service is started in December, 2009 and, in France, it is scheduled to start the service within 2011.

In Europe, a descriptor called AIT (Application Information Table) for management of an interactive application is prescribed. An ES (Engineering Service) by which an AIT is transmitted by data coding identification disposed in a PMT (Program Map Table) which is one piece of PSI (Program Specific Information) of the MPEG-2 (Moving Picture Experts Group phase 2) system is designated and another ES by which the AIT is transmitted by data coding identification transmitted with an independent ES is designated, and transmission is carried out by the independent ES. While the AIT has a field in which a profile (application profile) of a function or the like added to an interactive application can be described, operation of the application profile is entrusted to individual services.

A platform profile is a field in which information regarding a function which an application has is described. As the function which an application has, download, recording, download and reproduction at the same time by a RTSP (Real Time Streaming Protocol), content protection by DRM (Digital Rights Management), adaptive streaming and so forth of an A/V (Audio/Visual) content are available. Various functions are available other than the functions just described, and it is expected that the number of functions increases in the future.

SUMMARY

The number of bits given to the field for a platform profile is 16 in the standard. Generally, a bitmap structure in which one function is allocated to each of the bit positions of the 16 bits is adopted for the platform profile. By adopting the bitmap structure, 16 functions in the maximum can be represented in one platform profile. However, the number of kinds of additional functions to an application is inclined to increase in the future. Accordingly, it is expected that, in the structure of the platform profile in which 16 bits at present are used as a bitmap, a situation occurs that the representation capacity becomes insufficient.

Taking such a situation as described above into consideration, it is an object of the present technology to provide a transmission apparatus, an AIT transmission method and a reception apparatus by which enhancement of the representation capacity of a platform profile for describing an additional function to an application in the HbbTV can be achieved.

According to an embodiment of the present technology, a transmission apparatus includes an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16-n) bits which represent presence or absence of functions allocated to bit positions thereof with a bitmap structure and wherein, in the first bit region, values for changing over the functions to be allocated to the bit positions in the second bit region are set.

n may be one of values within a range from 2 to 14, preferably one of values within a range from 2 to 5.

Where all additional functions to the application cannot be represented by one application profile, the AIT transmission section may transmit a plurality of AITs including a plurality of application profiles in which values in the first bit regions are different from each other.

The transmission apparatus may further include a content transmission section adapted to transmit data of a content.

According to another embodiment of the present technology, an AIT transmission method includes transmitting an AIT including an application profile which represents one or more additional functions to the application for HbbTV and is configured from a first bit region of higher-order n bits and a second bit region of lower-order (16-n) bits which represent presence or absence of functions allocated to bit positions with a bitmap structure and wherein, in the first bit region, values for changing over the functions to be allocated to the bit positions in the second bit region are set.

According to a further embodiment of the present technology, a reception apparatus includes a reception section adapted to receive application data and an AIT transmitted from a transmission apparatus including an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16-n) bits which represent presence or absence of functions allocated to bit positions thereof with a bitmap structure and wherein, in the first bit region, values for changing over the functions to be allocated to the bit positions in the second bit region are set, and a decision section adapted to analyze the application profile included in the received AIT to decide the additional function of the received application.

The decision section may decide the additional function to the same application analyzed from a plurality of platform profiles in the plural AITs received at intervals by ORing.

As described above, with the present technology, enhancement of the representation capacity of a platform profile for describing an additional function to an application in the HbbTV can be achieved.

DETAILED DESCRIPTION OF THE PREFERRED EMBODIMENTS

In the following, an embodiment according to the present technology is described with reference to the drawings.

[HbbTV System]

Figure 1:
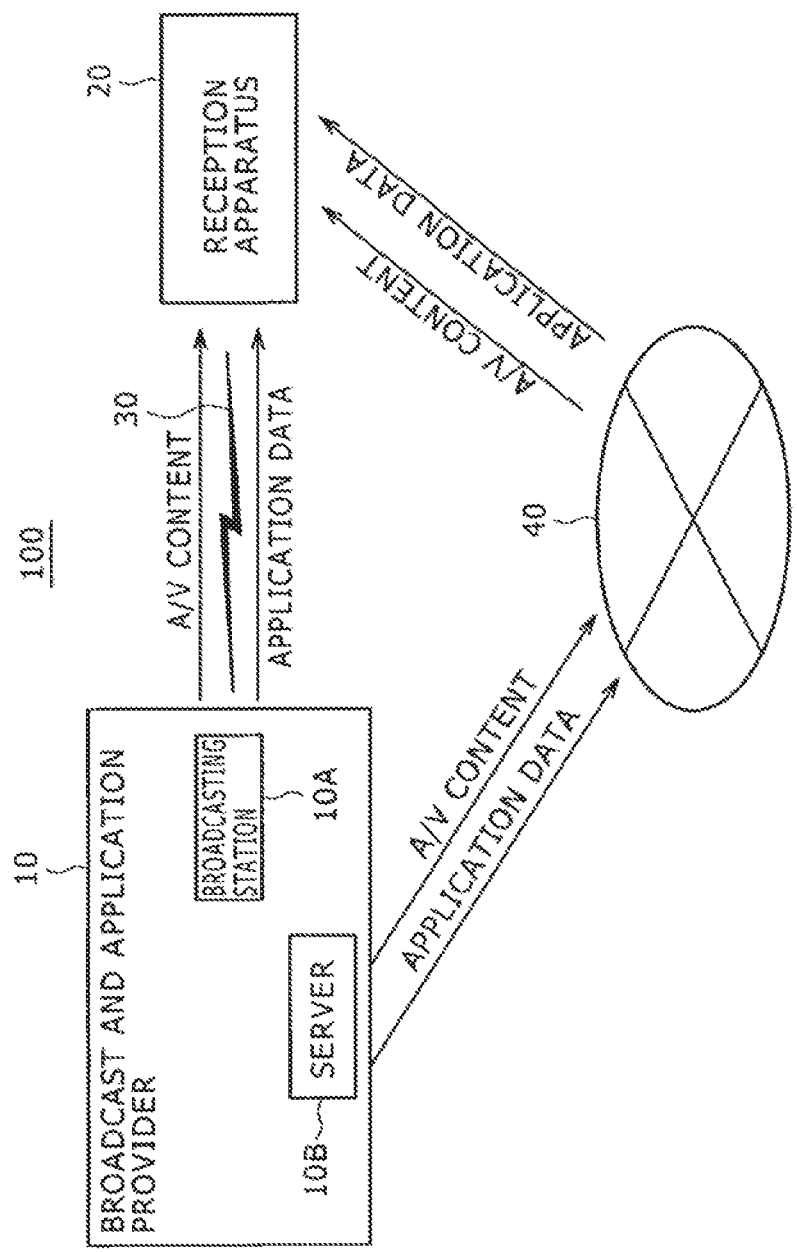
FIG. 1 is a view showing a configuration of an HbbTV system according to an embodiment of the present technology.

FIG. 1 is a view showing a configuration of an HbbTV system according to the embodiment of the present technology.

The HbbTV system 100 includes a broadcast and application provider 10, a reception apparatus 20 and a transmission system such as the Internet 40, broadcasting 30 and so forth. The broadcast and application provider 10 includes a broadcasting station 10A for broadcasting a linear AN content and interactive application data. Further, the broadcast and application provider 10 includes a server apparatus for delivering a non-linear A/V content and application data to the reception apparatus 20 through the Internet. A server 10B delivers the non-linear A/V content and the application data in response to a request from the reception apparatus 20 through the Internet.

The linear A/V content and the non-linear A/V content are a transport stream of the MPEG-2/Video or the like. An application includes, for example, a GUI (Graphical User Interface) which rouses the user so that a non-linear AN content is downloaded and reproduced and receives a reproduction instruction from the user, a URL (Uniform Resource Locator) of the non-linear AN content and so forth. In the HbbTV, the MPEG-2/Video or the like is adopted as a data format for an A/V content and the CE (Consumer Electronics)—HTML (Hyper Text Markup Language) or the like is adopted as a data format for a document.

The broadcasting station included in the broadcast and application provider 10 produces an AIT and broadcasts a broadcasting AIT. The server 10B can produce an XML-AIT (Extensible Markup Language-AIT) having the substance equivalent to that of the broadcasting AIT and delivers the produced XML-AIT in response to a request from the reception apparatus 20.

[Configuration of the Transmission Apparatus]

Figure 2:
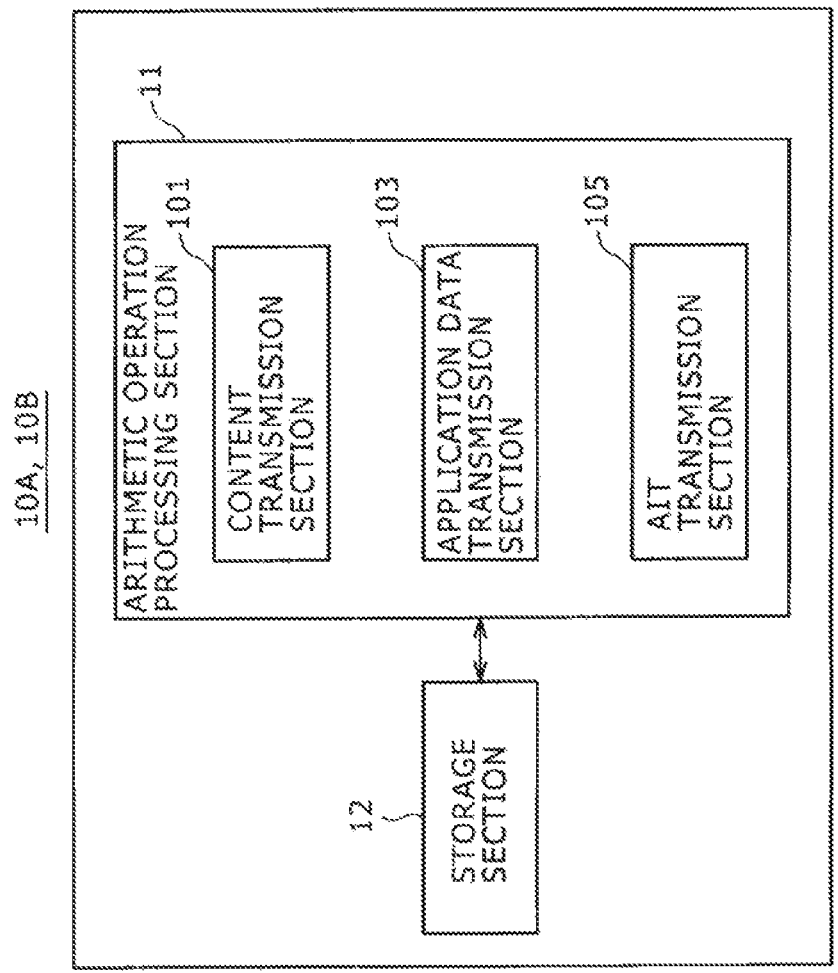
FIG. 2 is a block diagram showing a configuration of a transmission apparatus ready for the HbbTV system of the embodiment.

FIG. 2 is a block diagram showing a configuration of a transmission apparatus ready for the HbbTV system of the embodiment. The transmission apparatus particularly is the broadcasting station 10A and the server 10B included in the broadcast and application provider 10.

The transmission apparatus includes an arithmetic operation processing section 11 and a storage section 12. The arithmetic operation processing section 11 includes a CPU (Central Processing Unit), a main memory and a ROM (Read Only Memory). The storage section 12 is, for example, a large-capacity storage apparatus such as a hard disk drive.

The arithmetic operation processing section 11 includes, as a functional module configured by the CPU executing an arithmetic operation process based on a program stored in the main memory, a content transmission section 101 for transmitting a non-linear A/V content or a linear A/V content, an application data transmission section 103 for transmitting application data for the HbbTV and an AIT transmission section 105 for transmitting an AIT including an application profile. The storage section 12 stores the A/V content, application data and AIT transmitted thereto from the content transmission section 101, application data transmission section 103 and AIT transmission section 105.

The AIT transmission section 105 is configured from a first bit region of higher-order n bits and a second bit region of lower-order (16-n) bits of a bitmap structure and transmits an AIT including an application profile of 16 bits for specifying an additional function to the application through the broadcasting 30 or the Internet 40.

[Configuration of the Reception Apparatus]

Figure 3:
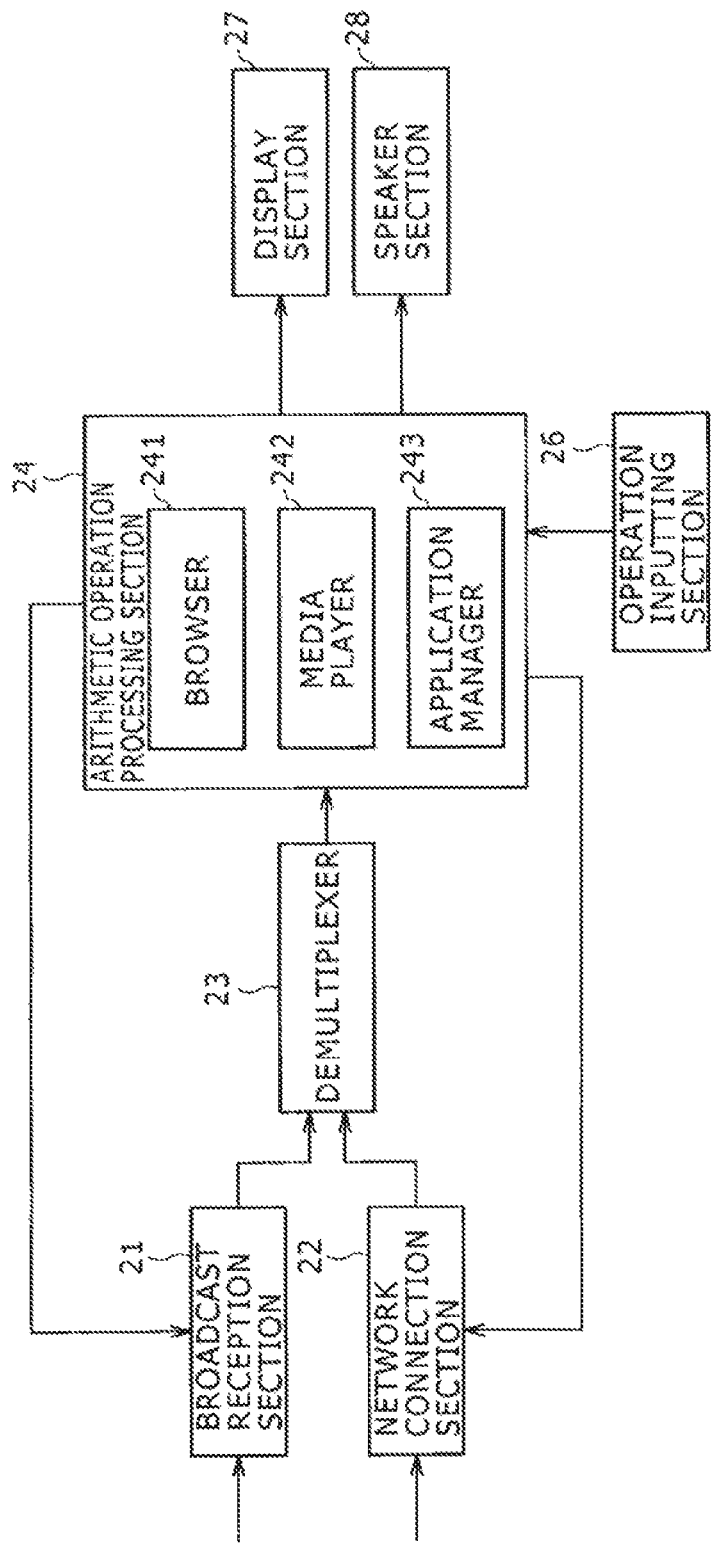
FIG. 3 is a block diagram showing a configuration of a reception apparatus ready for the HbbTV system of the embodiment.

FIG. 3 is a block diagram showing a configuration of the reception apparatus 20 ready for the HbbTV system of the embodiment.

The reception apparatus 20 is an electronic equipment capable of receiving an A/V content and application data provided from the broadcast and application provider 10 through the transmission systems of the broadcasting 30 and the Internet 40 and carrying out a process such as reproduction and so forth. More particularly, the reception apparatus 20 is a television set, a personal computer, a portable telephone set or the like.

The reception apparatus 20 includes a broadcast reception section 21 (reception section), a network connection section 22 (reception section), a demultiplexer 23, an arithmetic operation processing section 24, an operation inputting section 26, a display section 27 and a speaker section 28.

The broadcast reception section 21 receives an AN content, application data and a broadcast AIT broadcasted as a transport stream from the broadcast and application provider 10. The network connection section 22 can process the connection to the Internet 40 to access the server 10B of the broadcast and application provider 10 to receive an AN content, application data and an XML-AIT.

The demultiplexer 23 separates a video, an audio, an AIT and so forth from the transport stream received by the broadcasting reception section 21 and the network connection section 22.

The arithmetic operation processing section 24 includes a CPU (Central Processing Unit), a main memory and a ROM (Read Only Memory). In the main memory or the ROM, a browser 241, a media player 242 and an application manager 243 (decision section) are stored as software. The browser 241 carries out a displaying process of the application data. The media player 242 carries out a reproduction process of an A/V content. The application manager 243 analyzes an AIT to control start-up and stopping of the application. The application manager 243 analyzes the substance of a platform profile in the AIT to decide an additional function to the application.

The operation inputting section 26 receives an inputting operation from the user to issue a notification to the arithmetic operation processing section 24. The operation inputting section 26 may be configured from a key operation section provided on the main body of the reception apparatus 20, a remote controller or the like.

The display section 27 displays a document or an image processed by the browser 241 and a video of the A/V content reproduced by the media player 242. The speaker section 28 outputs, for example, an audio of the A/V content reproduced by the media player 242.

[AIT]

Now, the AIT is described.

The AIT is control information relating to the lifecycle of an application. As control information relating to the lifecycle of an application, for example, "AUTOSTART," "PRESENT," "DESTROY" and so forth are available. "AUTOSTART" is information for the instruction to start the application immediately. "PRESENT" is information for the instruction to receive the application by the reception apparatus 20 although it is not automatically executed. "DESTROY" is information for the instruction to stop the application. A hybrid terminal can acquire and start up an application designated, for example, so as to be started immediately based on control information relating to the lifecycle in the AIT.

Figure 4:
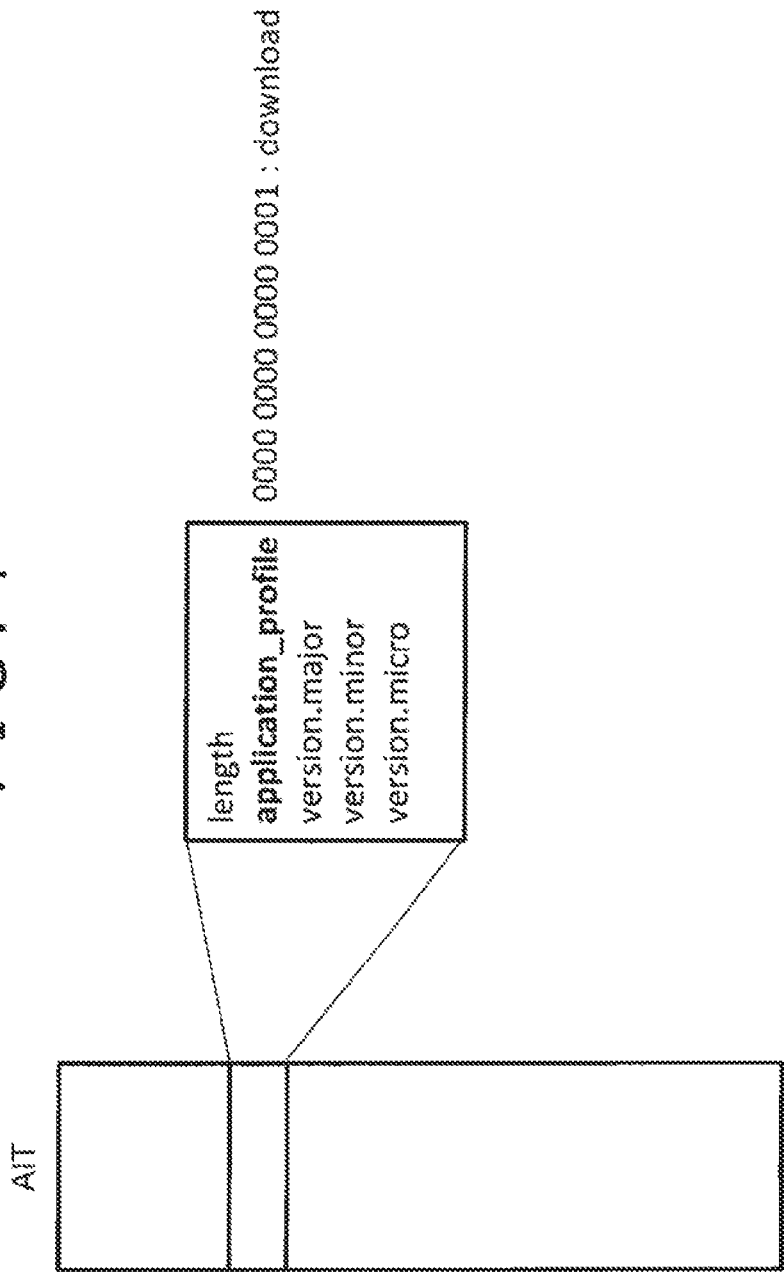
FIG. 4 is a view showing a configuration of an AIT.

As illustrated in FIG. 4, the AIT has a field for a platform profile. The platform profile is a field in which information relating to functions which the application has is described. The functions which the application has are, for example, download, recording, download and simultaneous reproduction by the RTSP (Real Time Streaming Protocol), content protection by DRM (Digital Rights Management), adaptive streaming and so forth of an AN content. Various other functions are available, and it is expected that functions increase in future.

The bit number given to the field for a platform profile is 16 bits according the standard. Generally, one function is allocated to the position of each of bits in an array of 16 bits. For example, functions are allocated in the following manner.

"0000 0000 0000 0000" no function
"0000 0000 0000 0001" download
"0000 0000 0000 0010" recording
"0000 0000 0000 0100" RTSP
"0000 0000 0000 1000" DRM
"0000 0000 0001 0000" adaptive streaming
"1000 0000 0000 0000"

Accordingly, in a general AIT, only up to 16 functions can be represented.

It is to be noted that, in order to represent that two functions of download and recording are available, the bits at the bit positions individually allocated to them may be set to "1" like

"0000 0000 0000 0011"

Figure 5:
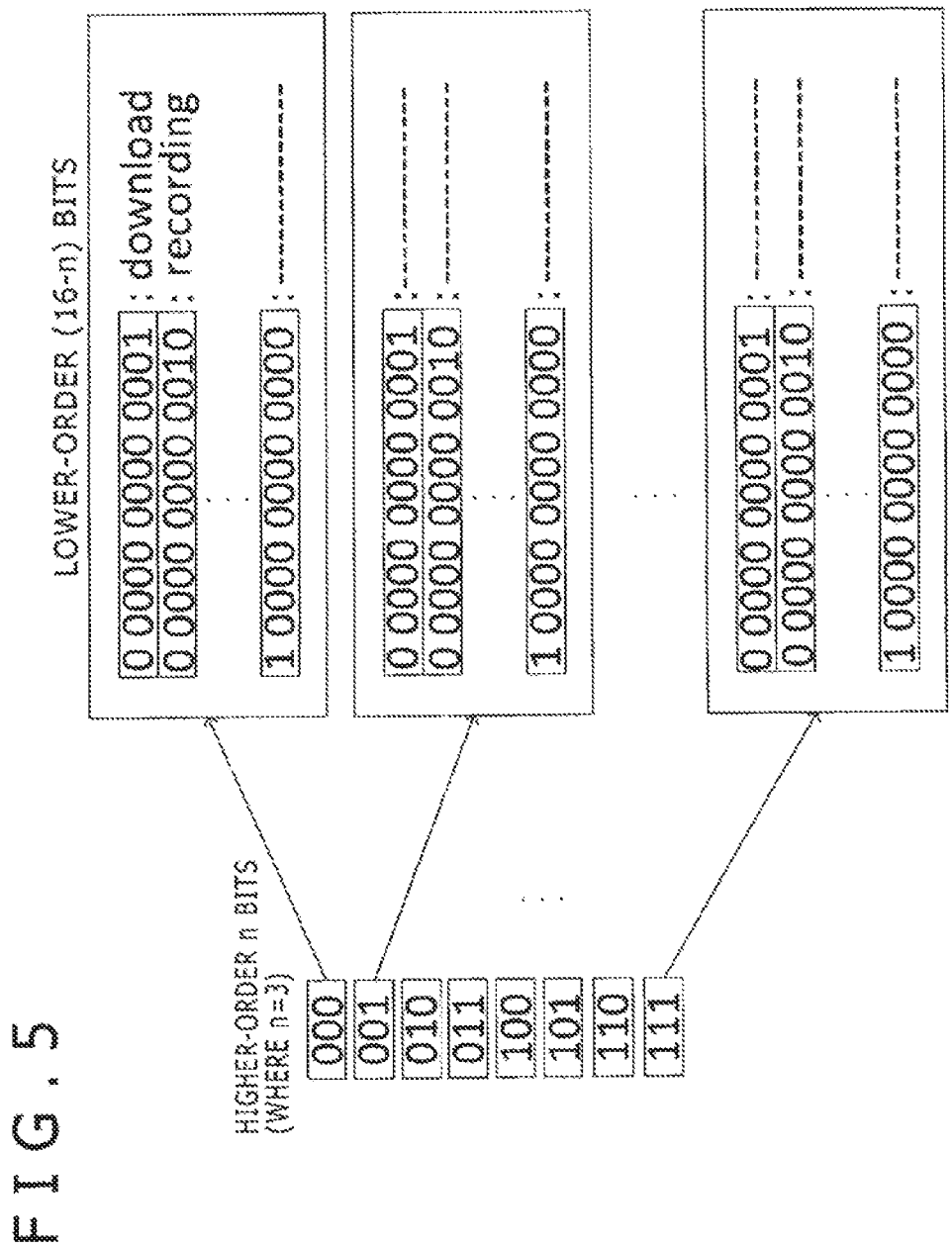
FIG. 5 is a view showing a structure of an application profile in the AIT of FIG. 4.

In the HbbTV system of the present embodiment, the totaling 16 bits of an application profile are handled separately for a first bit region of higher-order n bits, and a second bit region of lower-order (16-n) bits which represent presence or absence of a function allocated to each bit position in a bitmap structure. In the first bit region, values for changing over functions allocated to the individual bit positions of the second bit region are set. In particular, as illustrated in FIG. 5, although one function is allocated to each bit position in the second bit region similarly as in an ordinary case, the types of the functions rely upon the values in the first bit region.

For example, in the case of N=3, although
"0000 0000 0000 0001"
represents download,
"0010 0000 0000 0001"
represents a different function, and all of
"0100 0000 0000 0001"
"0110 0000 0000 0001"
"1000 0000 0000 0001"
"1010 0000 0000 0001"
"1100 0000 0000 0001"
"1110 0000 0000 0001"
represent different functions from one another.

If it is assumed that n is n=3, then the second bit region includes 13 bits. Accordingly, 13 functions can be represented for one dimension. Meanwhile, since totaling eight dimensions can be represented by the first bit region of 3 bits, 13×8=104 functions can be represented by the field for an application profile of 16 bits.

Incidentally, according to the method described above, if n is set to n=4, then 176 functions can be represented, and if n is set to n=5, then 320 functions can be represented. In particular, as the number of bits to be utilized as the first bit region increases, the number of functions which can be represented increases. In this sense, n can be set to a value ranging from 2 to 14.

However, if the number of bits to be utilized as the first bit region is increased to decrease the second bit region, then the maximum number of functions which can be represented by one application profile decreases, and in order to convey all functions, the values of the first bit region are changed to transmit many application profiles. Accordingly, the number of bits to be utilized as the first bit region should be selected optimally in response to the total number of kinds of available functions within the range from 2 to 5. The reason is that, even if the total number of functions which can be represented is increased to 640 or more by setting the bit number of the first bit region to 6 or more, it seems less likely to occur that the number of kinds of functions increases to such number in future and the demerit caused by decrease of the number of functions which can be represented by one application profile is significant.

In the transmission apparatus of the broadcast and application provider 10, the AIT transmission section 105 transmits an AIT including an application profile structured in such a manner as described above to the reception apparatus 20 through the broadcasting 30 or the Internet 40.

In the reception apparatus 20, a video, an audio, an AIT and so forth are separated from a transport stream received by the broadcast reception section 21 and the network connection section 22 by the demultiplexer 23. The separated AIT is analyzed by the application manager 243. In the analysis of the AIT, the application manager 243 analyzes the AIT in accordance with the structure of the platform profile in the AIT to decide an additional function to the application.

The application manager 243 decides the additional function analyzed from a plurality of platform profiles received at intervals for the same application by ORing. Consequently, when the transmission apparatus cannot represent all functions using one platform profile because of the number of such functions, it can distribute the functions to a plurality of platform profiles and transmit the functions to the reception apparatus 20.

In this manner, even with a platform profile restricted to a field of 16 bits, the number of functions which can be represented can be increased greatly by using the higher-order n bits as information for making the allocation of the functions allocated to bit positions of second bit region of lower-order (16-n) bits plural dimension.

It is to be noted that the present technology can adopt such configurations as described below.

(1) A transmission apparatus, including:
an application data transmission section adapted to transmit data of an application for HbbTV; and
an AIT transmission section adapted to transmit an AIT including an application profile which represents one or more additional functions to the application and is configured from a first bit region of high-order n bits and a second bit region of lower-order (16-n) bits which represent presence or absence of functions allocated to bit positions thereof with a bitmap structure and wherein, in the first bit region, values for changing over the functions to be allocated to the bit positions in the second bit region are set.

(2) The transmission apparatus according to (1), wherein the n is one of values within a range from 2 to 14.

(3) The transmission apparatus according to (1), wherein the n is one of values within a range from 2 to 5.

(4) The transmission apparatus according to any one of (1) to (3), wherein, where all additional functions to the application cannot be represented by one application profile, the AIT transmission section transmits a plurality of AITs including a plurality of application profiles in which values in the first bit regions are different from each other.

(5) The transmission apparatus according to any one of (1) to (4), further including a content transmission section adapted to transmit data of a content.

(6) A reception apparatus, including:
a reception section adapted to receive application data and an AIT transmitted from a transmission apparatus including an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16-n) bits which represent presence or absence of functions allocated to bit positions thereof with a bitmap structure and wherein, in the first bit region, values for changing over the functions to be allocated to the bit positions in the second bit region are set; and
a decision section adapted to analyze the application profile included in the received AIT to decide the additional function of the received application.

(7) The reception apparatus according to (6), wherein n is one of values within a range from 2 to 14.

(8) The reception apparatus according to (6), wherein n is one of values within a range from 2 to 5.

(9) The reception apparatus according to any one of (6) to (8), wherein the decision section decides the additional function to the same application analyzed from a plurality of platform profiles in the plural AITs received at intervals by ORing.

It should be understood by those skilled in the art that various modifications, combinations, sub-combinations and alterations may occur depending on design requirements and other factor in so far as they are within the scope of the appended claims or the equivalents thereof.

What is claimed is:

1. A transmission apparatus, comprising:
application data transmission circuitry that transmits to a reception device application data of an application, based on a request; and
table transmission circuitry that transmits to the reception device a first application profile of a plurality of application profiles, based on the request, wherein
the first application profile includes information of a plurality of function types of the application,
the first application profile comprises a high-order bit region corresponding to a plurality of high-order bits of the first application profile and a low-order bit region corresponding to a plurality of low-order bits of the first application profile,
a first function type of the plurality of function types of the application is set based on a correspondence of a first value of the high-order bit region with a first bit position of a plurality of bit positions in the low-order bit region;
a total number of the plurality of function types in the first application profile is a multiplication product of a number of the plurality of high-order bits and a number of the plurality of low-order bits,
the number of the plurality of high-order bits is equal to n and the number of the plurality of low-order bits is equal to 16−n, and
n is a value in a range of 2-14.

2. The transmission apparatus according to claim 1, wherein
the table transmission circuitry further transmits the plurality of application profiles,
each application profile of the plurality of application profiles indicates one of the plurality of function types of the application,
the first value of the high-order bit region is different from a second value of the high-order bit region, and
the second value, that corresponds to a second bit position of the plurality of bit positions in the low-order bit region, indicates a second function type of the plurality of function types of the application.

3. The transmission apparatus according to claim 2, wherein:
the first value of the high-order bit region, that corresponds to the first bit position in the low-order bit region, indicates the first function type of the application, and
the first function type is different from the second function type.

4. The transmission apparatus according to claim 1, further comprising content transmission circuitry that transmits audio/video (A/V) content of the application.

5. A transmission method, comprising:
transmitting application data to a reception device based on a request, wherein the application data is associated with an application; and
transmitting a first application profile of a plurality of application profiles to the reception device, based on the request, wherein
the first application profile includes information of a plurality of function types of the application,
the first application profile comprises a high-order bit region corresponding to a plurality of high-order bits of the first application profile and a low-order bit region corresponding to a plurality of low-order bits of the first application profile,
a first function type of the plurality of function types of the application is set based on a correspondence of a first value of the high-order bit region with a first bit position of a plurality of bit positions in the low-order bit region,
a total number of the plurality of function types in the first application profile is a multiplication product of a number of the plurality of high-order bits and a number of the plurality of low-order bits,
the number of the plurality of high-order bits is equal to n and the number of the plurality of low-order bits is equal to 16−n, and
n is a value in a range of 2-14.

6. The transmission method according to claim 5, further comprising transmitting the plurality of application profiles to the reception device, wherein
  each application profile of the plurality of application profiles indicates one of the plurality of function types of the application,
  the first value of the high-order bit region is different from a second value of the high-order bit region, and
  the second value, that corresponds to a second bit position of the plurality of bit positions in the low-order bit region, indicates a second function type of the plurality of function types of the application.

7. The transmission method according to claim 6, wherein:
  the first value of the high-order bit region that corresponds to the first bit position in the low-order bit region, indicates the first function type of the application, and
  the first function type is different from the second function type.

8. A reception apparatus, comprising:
  reception circuitry to:
    receive application data of an application; and
    receive a first application profile of a plurality of application profiles, wherein
      the first application profile includes information of a plurality of function types of the application,
      the first application profile comprises a high-order bit region corresponding to a plurality of high-order bits of the first application profile and a low-order bit region corresponding to a plurality of low-order bits of the first application profile,
      a first function type of the plurality of function types of the application is set based on a correspondence of a first value of the high-order bit region with a first bit position of a plurality of bit positions in the low-order bit region;
      a total number of the plurality of function types in the first application profile is a multiplication product of a number of the plurality of high-order bits and a number of the plurality of low-order bits,
      the number of the plurality of high-order bits is equal to n and the number of the plurality of low-order bits is equal to 16-n, and
      n is a value in a range of 2-14; and
    decision circuitry that determines the first function type based on the first application profile.

9. The reception apparatus according to claim 8, wherein the decision circuitry further determines the plurality of function types of the application based on one of the plurality of application profiles.

10. The reception apparatus according to claim 8, wherein
  the first value of the high-order bit region, for a same bit position of the plurality of bit positions in the low-order bit region, indicates the first function type of the application,
  a second value of the high-order bit region, that corresponds to the same bit position of the plurality of bit positions in the low-order bit region, indicates a second function type of the plurality of function types of the application, and
  the first function type is different from the second function type.

\* \* \* \* \*